(12) United States Patent
Schapira et al.

(10) Patent No.: US 11,247,420 B2
(45) Date of Patent: Feb. 15, 2022

(54) SYSTEM AND METHOD FOR PRODUCING ARTISANAL DECORATIVE VENEERS

(71) Applicants: Djivan Schapira, Union City, NJ (US); Antoine Schapira, Union City, NJ (US)

(72) Inventors: Djivan Schapira, Union City, NJ (US); Antoine Schapira, Union City, NJ (US)

( * ) Notice: Subject to any disclaimer, the term of this patent is extended or adjusted under 35 U.S.C. 154(b) by 161 days.

(21) Appl. No.: 16/281,222

(22) Filed: Feb. 21, 2019

(65) Prior Publication Data
US 2019/0283348 A1    Sep. 19, 2019

Related U.S. Application Data

(60) Provisional application No. 62/634,145, filed on Feb. 22, 2018.

(51) Int. Cl.
| | | |
|---|---|---|
| *B29D 7/01* | (2006.01) | |
| *B32B 38/00* | (2006.01) | |
| *B29K 33/04* | (2006.01) | |
| *B29L 31/00* | (2006.01) | |
| *B29K 711/14* | (2006.01) | |

(52) U.S. Cl.
CPC .......... *B29D 7/01* (2013.01); *B29C 2793/009* (2013.01); *B29K 2033/04* (2013.01); *B29K 2711/14* (2013.01); *B29L 2031/722* (2013.01); *B29L 2031/732* (2013.01); *B32B 38/0004* (2013.01); *Y10T 156/1057* (2015.01)

(58) Field of Classification Search
CPC ....... B29C 39/00; B29C 39/19; B29C 70/687; B29K 2711/14; B29L 2031/722; B32B 38/0004; Y10T 156/2057
See application file for complete search history.

(56) References Cited

U.S. PATENT DOCUMENTS

| | | | | |
|---|---|---|---|---|
| 5,441,787 A | * | 8/1995 | Fujii | B27L 11/08 144/358 |
| 2003/0205316 A1 | * | 11/2003 | Kai | B27M 3/04 156/250 |
| 2015/0224754 A1 | * | 8/2015 | Lin | F41J 3/0095 156/263 |
| 2018/0272648 A1 | * | 9/2018 | Ding | B32B 15/18 |

OTHER PUBLICATIONS

DiResta, "DiResta's Cut: Experimenting with Branches and Resin", https://www.youtube.com/watch?v=hPhINMy20jU: Cutting Branches, 0:27 (Year: 2017).*
DiResta, "DiResta's Cut: Experimenting with Branches and Resin", https://www.youtube.com/watch?v=hPhINMy20jU Resin Mold Branches Equal Length, 3:18 (Year: 2017).*
DiResta, "DiResta's Cut: Experimenting with Branches and Resin", https://www.youtube.com/watch?v=hPhINMy20jU Resin Block, 3:48 (Year: 2017).*
DiResta, "DieResta: Birch Slice Table", https://www.youtube.com/watch?v=S-gXkCSPQYo, Form Upon Holder, 1:30 (Year: 2012).*
DiResta, "DieResta: Birch Slice Table", https://www.youtube.com/watch?v=S-gXkCSPQYo, Cured Slab After From Removal, 2:35 (Year: 2012).*

* cited by examiner

*Primary Examiner* — Mark A Osele
*Assistant Examiner* — Christopher C Caillouet
(74) *Attorney, Agent, or Firm* — Clifford H. Kraft

(57) ABSTRACT

A system and method of producing, large, very thin veneer patterns that can be used to decorate furniture such as table tops, flooring and interior decor or any other flat surface that show a plurality of wood end grain patterns. The process includes cutting a plurality of various diameter pieces of wood such as branches to expose the end grain. The pieces are then arranged in a holder with each piece sticking upward so that looking down, the end grain on each piece can be seen. The holder is then filled with a clear or pigmented resin and allowed to set. The hard resin slab is then removed and sawed in to very thin slices. Each thin slice is a desired veneer that can then be further glued onto a table top or the like. Symmetry patterns can be created by arranging veneers from subsequent layers side-by-side in various configurations.

15 Claims, 1 Drawing Sheet

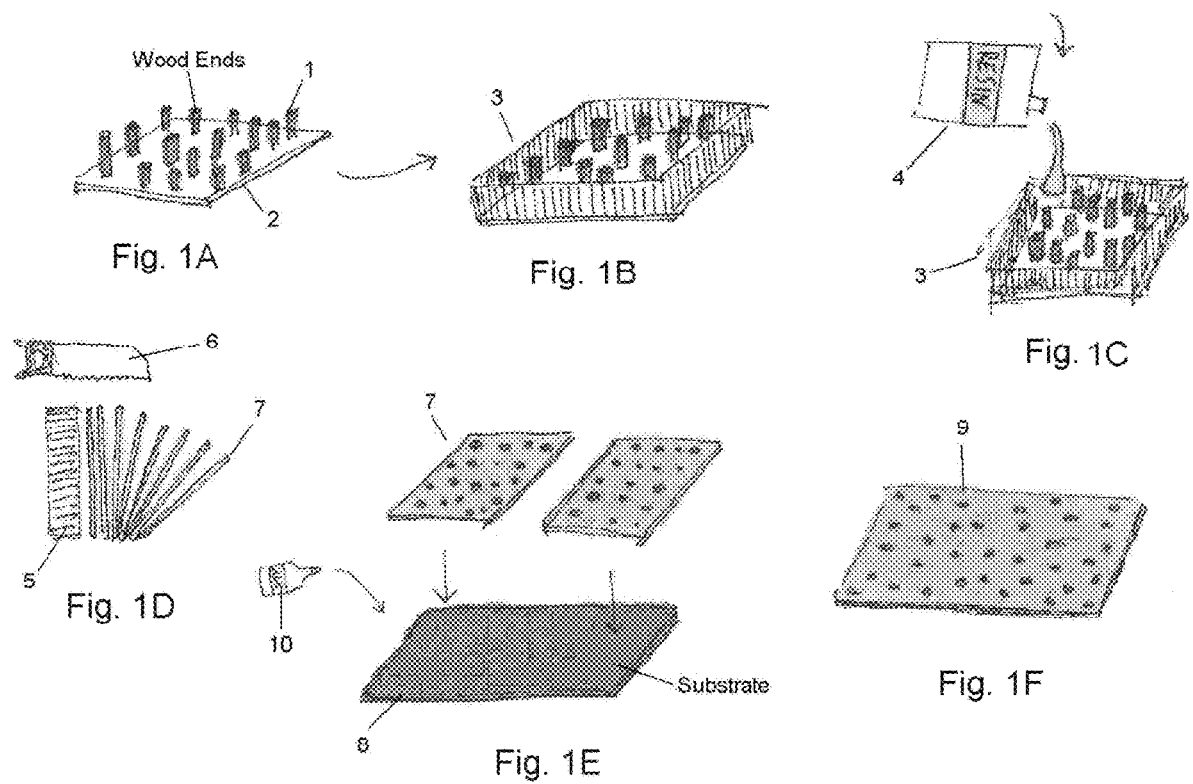

SYSTEM AND METHOD FOR PRODUCING ARTISANAL DECORATIVE VENEERS

This application is related to, and claims priority from U.S. Provisional Patent Application No. 62/634,145 filed Feb. 22, 2018. Application 62/634,145 is hereby incorporated by reference in its entirety.

BACKGROUND

Field of the Invention

The present invention relates generally to the field of decorative veneers and more particularly to a system and method for producing specialized thin veneers for tabletops, decorative wall displays and flooring, as well as any flat surface showing a plurality of end-on wood grain patterns.

Description of the Problem Solved

It is known that the ends of a wooden branches, when sawed off and polished show remarkable and beautiful wood grain patterns. While polished wood has been used in prior art veneers, it has been with a single lateral cut through the wood. There are prior art simple clusters of end grain branches glued together to create tables or coasters; however, these are not veneers.

It would be very advantageous to be able to produce multiple very thin veneers that display patterns from the end of the wood using a plurality of cuts from wooden branches (in French_au bout du bois_at the end of the wood).

SUMMARY OF THE INVENTION

The present invention relates to a system of, and a method of producing very thin veneer patterns that can be used to decorate furniture such as table tops, mounted wall displays and flooring and virtually any other item that show a plurality of wood end grain patterns. The process includes cutting a plurality of various size pieces of wood such as branches to expose the end grain. The wood pieces can be cut to a convenient working length of up to several inches long. The pieces are then arranged in a holder with each piece sticking upward so that looking down, the end grain on each piece can be seen. The holder is then inserted in a form or mold which is filled with a clear or colored resin and allowed to set. The hard resin slab is then removed and sawed in to very thin slices. Each thin slice is a desired veneer that can then be further glued onto a substrate such as a table top or any other flat surface. Symmetry patterns can be created by arranging veneers from subsequent layers side-by-side in various configurations. This process allows the creation of very intricate, symmetrical and repetitive designs which can be replicated in numerous additional pieces. While the resin acts as a canvas, the end grain act as the pencil.

The present invention is thus a methodical way of creating a resin/end grain veneer which is then applied to surfaces to create furniture, flooring and interior decor. This method makes it much easier to produce one-of-a kind unique pieces at industrial scalability. It is a goal of the present invention to bring a level of industrial design and process to a very refined and artisan way of making furniture, flooring and decorative wood pieces.

DESCRIPTION OF THE FIGURES

Attention is now directed to several figures that illustrate features of the present invention:

FIG. 1A shows a plurality of cut wood pieces arranged in a base holder.

FIG. 1B show placing the base holder in a form.

FIG. 1C shows adding clear liquid resin to the form to cover the wood pieces.

FIG. 1D shows slicing the hardened resin slab into veneer sheets after the resin sets.

FIG. 1E shows placing glue on a substrate and placing veneer sheets onto the substrate.

FIG. 1F shows the final result of the veneer attached to the substrate.

Several drawings and illustrations have been presented to aid in understanding the present invention. The scope of the present invention is not limited to what is shown in the figures.

DESCRIPTION OF THE PREFERRED EMBODIMENTS

The present invention relates to a system of, and a method of making, thin veneer sheets that can be used as surfaces of table tops, flooring, decorative panels and any other flat surface. These veneer sheets show the end grain patterns of a plurality of pieces of wood.

Turning to FIG. 1A, a plurality of cut wood pieces 1 can be seen arranged vertically on a holder 2. The length of each wood piece can be between 3 to 5 inches tall. While this is a preferred length, any length is within the scope of the present invention. The diameters of the wood pieces 1 can be chosen to create a desired pattern which and be pre-drawn on the holder 2. A typical diameter of the wood pieces is from ⅛ inch to several inches. However, any size may be used. The holder 2 can be plywood or any other suitable flat base.

The holder 2 is next placed into a form or mold 3 as shown in FIG. 1B. The form 3 can be any shape container (e.g., square, rectangle, triangle, circle, semi-circle) with walls to hold the resin while it cures. The depth of the form 3 should approximately match the lengths of the wood pieces 1.

FIG. 1C shows the addition of transparent acrylic resin 4 to the form 3. Pigments may optionally be added to the resin to provide a particular color effect of the final product. While acrylic is preferred, any clear resin may be used. Single or multiple pours may be used. Any clear or colored resin may be used such as those manufactured by Smooth-on.

After the resin has set, the hard slab 5 may be removed from the form 3 and sliced as shown in FIG. 1D. While a hand saw 6 is shown in FIG. 1D, in practice, a precise mechanical saw is used. The slices 7 are final veneer pieces. They are typically 1/16 inches in thickness; however, other thicknesses may be used and are within the scope of the present invention.

The veneer slices 7 can then be arranged over a surface or substrate 8 for final attachment as shown in FIG. 1E. The substrate 8 may be any surface that will receive decoration. A typical substrate is a table top, wall, floor or any other flat surface. Glue or epoxy 10 is used to attach the veneer slices 7 to the substrate 8. These are laid down flat and can be arranged to form symmetry patterns by using successive slices from the slab 5.

FIG. 1F shows the final result 9 which can be a table or piece of furniture or the like that has received the veneer surface and shows a unique and decorative pattern. The outside shape of the veneer slices 7 can be cut to match the final shape of the substrate surface. For symmetry, typically two or four subsequent slices can be placed on the substrate 8. The surface is typically finished by placing a layer of transparent resin on top of the veneer and then buffing it to a high polish.

SUMMARY OF THE PROCESS

1. Cut branches
2. Apply printed design to piece of plywood holder
3. Build form or mold around plywood holder
4. Place branches in form
5. Mix resin
6. Add desired pigment to resin
7. Pour resin into form
8. Let cure into a solid slab
9. Cut slab into thin veneer resin sheets
10. Apply veneer sheets to substrate
11. Joint the veneer
12. Glue the veneer to substrate
13. Shape top
14. Sand top
15. Apply resin finish on top for high polish
16. Buff (polish) top The present invention relates to a system of thin veneer sheets that are highly desirable as decor or decoration for furniture, flooring, wall decor or any other flat surface. The present invention also relates to a method for producing these veneer sheets and producing highly decorative high-end furniture, flooring, interior decor and the like.

Several descriptions and illustrations have been provided to aid in understanding the present invention. One with skill in the art will realize that numerous changes and variations may be made without departing from the spirit of the invention. Each of these changes and variations is within the scope of the present invention.

We claim:

1. A method for producing a veneer comprising:
   (a) cutting a plurality of wood branches to a predetermined length;
   (b) applying a printed design to a flat piece of plywood to form a holder;
   (c) building a form or mold around the holder;
   (d) placing the branches upright in the form;
   (e) mixing resin;
   (f) adding a desired pigment to the resin, or adding no pigment to the resin;
   (g) pouring the resin into the form;
   (h) allowing the resin to cure in the form into a solid slab;
   (i) removing the solid slab from the form and cutting the solid slab into a plurality of thin veneer sheets;
   (j) gluing at least one of the veneer sheets onto a substrate.

2. The method of claim 1 further comprising:
   (k) the substrate with the least one glued veneer sheets having a top surface, shaping the top surface to a desired flatness or contour;
   (L) sanding the top surface;
   (m) applying resin finish to the top surface;
   (n) buffing the top surface to obtain a high gloss polish.

3. The method of claim 2 wherein the substrate is a surface on a piece of furniture.

4. The method of claim 3 wherein the piece of furniture is a table.

5. The method of claim 2 wherein the substrate is a floor tile.

6. The method of claim 2 wherein the substrate is one of a series of decorative pieces capable of being mounted on a wall.

7. The method of claim 1 wherein the substrate is a surface on a piece of furniture.

8. A method for producing a veneer comprising:
   (a) cutting a plurality of wood branches to a predetermined length;
   (b) cutting a flat surface to form a holder;
   (c) applying a printed design on the holder;
   (d) building a form or mold around the holder, or placing the holder into a pre-constructed form;
   (e) placing the branches upright in the form, on the holder;
   (f) mixing resin;
   (g) pouring the resin into the form;
   (h) allowing the resin to cure in the form into a solid slab;
   (i) removing the solid slab from the form and cutting the solid slab into a plurality thin veneer sheets.

9. The method of claim 8 further comprising:
   (j) gluing at least one of the veneer sheets onto a substrate.

10. The method of claim 9 further comprising:
    (k) the substrate with the least one glued veneer sheet having a top surface, shaping the top surface to a desired flatness or contour;
    (L) sanding the top surface;
    (m) applying resin finish to the top surface.

11. The method of claim 10 further comprising:
    (n) buffing the top surface to obtain a high gloss polish.

12. The method of claim 10 wherein the substrate is a surface on a piece of furniture.

13. The method of claim 12 wherein the piece of furniture is a table.

14. The method of claim 10 wherein the substrate is a floor tile.

15. The method of claim 10 wherein the substrate is one of a series of decorative pieces capable of being mounted on a wall.

* * * * *